United States Patent
Brodey et al.

(10) Patent No.: US 6,677,928 B1
(45) Date of Patent: Jan. 13, 2004

(54) METHOD AND SYSTEM FOR IMPROVED COMMUNICATION BETWEEN HUMAN AND COMPUTER

(75) Inventors: Warren Mortimer Brodey, Oslo (NO); Hans Kristian Holmen, Asker (NO)

(73) Assignee: Computouch A/S (NO)

( * ) Notice: Subject to any disclaimer, the term of this patent is extended or adjusted under 35 U.S.C. 154(b) by 0 days.

(21) Appl. No.: 09/743,326
(22) PCT Filed: Jun. 18, 1999
(86) PCT No.: PCT/NO99/00207
§ 371 (c)(1), (2), (4) Date: Mar. 9, 2001
(87) PCT Pub. No.: WO00/03319
PCT Pub. Date: Jan. 20, 2000

(30) Foreign Application Priority Data

Jul. 10, 1998 (NO) ................................................ 983206

(51) Int. Cl.[7] .................................................. C09G 5/00
(52) U.S. Cl. ...................... 345/156; 345/164; 345/166; 345/856; 345/857; 345/858
(58) Field of Search ................................. 345/163–166, 345/856–858, 862, 865; 434/112, 114, 117; 463/30; 340/823.19, 407.2

(56) References Cited

U.S. PATENT DOCUMENTS

| | | | | | |
|---|---|---|---|---|---|
| 4,801,829 | A | * | 1/1989 | Baba | 310/10 |
| 5,790,108 | A | * | 8/1998 | Salcudean et al. | 345/184 |
| 5,825,308 | A | * | 10/1998 | Rosenberg | 341/20 |
| 5,912,660 | A | | 6/1999 | Gouzman et al. | |
| 5,914,705 | A | * | 6/1999 | Johnson et al. | 345/163 |
| 6,191,774 | B1 | * | 2/2001 | Schena et al. | 345/163 |
| 6,232,891 | B1 | * | 5/2001 | Rosenberg | 341/20 |
| 6,452,586 | B1 | * | 9/2002 | Holmdahl et al. | 345/163 |

FOREIGN PATENT DOCUMENTS

| | | |
|---|---|---|
| DE | 4140780 A | 12/1991 |
| DE | 4319795 A | 1/1994 |

\* cited by examiner

*Primary Examiner*—Bipin Shalwala
*Assistant Examiner*—Leonid Shapiro
(74) *Attorney, Agent, or Firm*—Rothwell, Figg, Ernst & Manbeck P.C.

(57) ABSTRACT

System for controlling a marker on data screen using a pointer tool, the pointer tool comprising an indication device for tactile feedback to the user for transferring information about the marker's movements on the screen, the indication device for tactile feedback being adapted to transmit information in at least two dimensions.

7 Claims, 7 Drawing Sheets

METHOD AND SYSTEM FOR IMPROVED COMMUNICATION BETWEEN HUMAN AND COMPUTER

BACKGROUND OF THE INVENTION (1). Field of the Invention

This invention relates to a system controlling a marker (5) on e.g., a computer screen, using a pointer tool, the pointer tool comprising an indication device for tactile feedback to the user for transferring information about the markers movements on the screen.

(2) Description of Related Art

Electronic computers have in recent years become the most important tool for many working in the fields of production of documents, graphic design, technical drawings etc, as well as in number treatment such as large calculations, statistics, administrative systems, quality control systems, accounting etc. Many of the tasks which are now typical in small companies and with private persons, were unthinkable a relatively short time ago, even for larger and more resourceful companies.

The development of the computer with necessary peripheral equipment (display, keyboard, pointer tools, printers and other terminal devices) has made it possible to utilize increasingly powerful software in an increasing number of sectors. New and more powerful software has been developed to use the improved computers—and vice versa—as a continuous process. The development has repeatedly provided shorter operation time for each working operation and more storing capacity, both for intermediate calculations and for the final results. This has made it possible to establish large program libraries, procedure archives and databases for storage of knowledge and experience and to retrieve them in an effective way.

The possibilities for the operator to quickly and efficiently communicate with the computer has, however, mainly been limited by the computer's ability to present the results of the completed work on a screen as text or a graphic image, or possibly as a paper print. The operator then has to read or in other ways interpret the results visually before any corrections may be planned and performed—and the work possibly may continue.

The most common types of equipment used to give control commands as well as provide necessary information to the computer for performing the work are:

Pointer tools (such as "mouse", "Joystick", "Roller ball", or pressure sensitive pads); and Keyboard (as for a typewriter)

The operator gives commands necessary to perform the task using the pointer tool or keyboard. From a computer screen or print he may thus obtain a confirmation that the task was performed.

The use of the pointer tool requires that a graphical interface is established in the communication from the computer to the operator. By far most computers today use such an interface and an operative system based on extensive use of a pointer tool (e.g. Windows 95). For sake of simplicity, the description of the pointer tool will here be limited to use of the pointer tool of the mouse type. It is, however, clear that the invention may also be used in relation to other pointer tools.

Using the pointer tool, the movements of a marker, often being a symbol shaped as an arrow head, may be controlled within the image shown on the computer screen. In combination with or with the aid of switches on the pointer tool, an object may be marked as singular points, as well as larger or smaller areas in the shown image, in which it is desired to make changes or one in some way will provide information to the computer.

On a computer screen a "point" is, however, in reality always an area, i.e., the "point" will have a certain extension on the display. In the following part of this description a point means: the smallest area which may be pointed at with the marker. Several "points" constitute an "area". The monitoring confirming that the marker is controlled correctly and accurately is performed by following the movements with the eyes. If the possible areas which may be selected are positioned close to each other, a high degree of accuracy and attentiveness in the navigation of the marker is demanded if errors are to be avoided.

The use of a pointer tool such as a mouse, or similar device, has thus become a limitation in the exploitation of the capacity of modern computers. Most likely the intense concentration being demanded from the operator when performing the detailed steering in high precision navigation, makes the operator tired and unattentive. The precision is reduced, errors occur and the real capacity of exploitation in the operator/computer combination is reduced.

Feedback to the operator through the mouse has been suggested when the marker passes over an object on the computer screen. Examples of such solutions are shown in EP 507,580 and EP 265,011. This information given to the operator is, however, insufficient, as he still will have to watch the screen to move the marker to the right position.

SUMMARY OF THE INVENTION

Thus, it is an object of this invention to provide a system which solves these problems, and thus increases the efficiency of both the computer and the user.

The present invention functions as a tactile, interactive system.

It provides direct feedback to the hand, in parallel and simultaneously as the same changes are shown on the screen, i.e. the operator may see and feel the information from the computer simultaneously.

The operator may thus choose between or combine the two forms of sensed impressions when receiving information from the computer, and hand and pointer tool may thus feel their way.

The hand and the felt change in the mouse may thus take over some of the routine work in steering the pointer tool and thus liberate brain capacity for more demanding tasks, such as controlling already performed commands and planning further work.

This is more in line with normal and hereditary habits in human behavior.

The strain on the sensory organs is thus reduced relative to the present situation in which one of the sensory organs receives all information from the computer. The interpretation of information from touch/sensing takes only approximately ⅔ of the time for interpreting visual impressions with the same amount of information.

Thus it is expected that the use of computers and software will become more effective. The experience from trials and use of the system according to the invention is that it takes very short time before one is able to use it—and that those who have tried the system immediately see great advantages for the ordinary user of computers.

BRIEF DESCRIPTION OF THE DRAWINGS

The invention will be described below with reference to the accompanying drawings, illustrating the invention by way of examples on possible embodiments.

FIGS. 7(a), (b) show a vertical section of the drive unit in FIG. 6, as well as a schematic image of the electromagnetic drives in a neutral condition.

FIGS. 8(a), (b) show a section and schematic image corresponding to FIG. 7, in which the drives are subject to a voltage in a first direction.

FIGS. 9(a), (b) show a similar situation as FIG. 8 in which the current is applied in the opposite direction.

DETAILED DESCRIPTION

Figure 1:
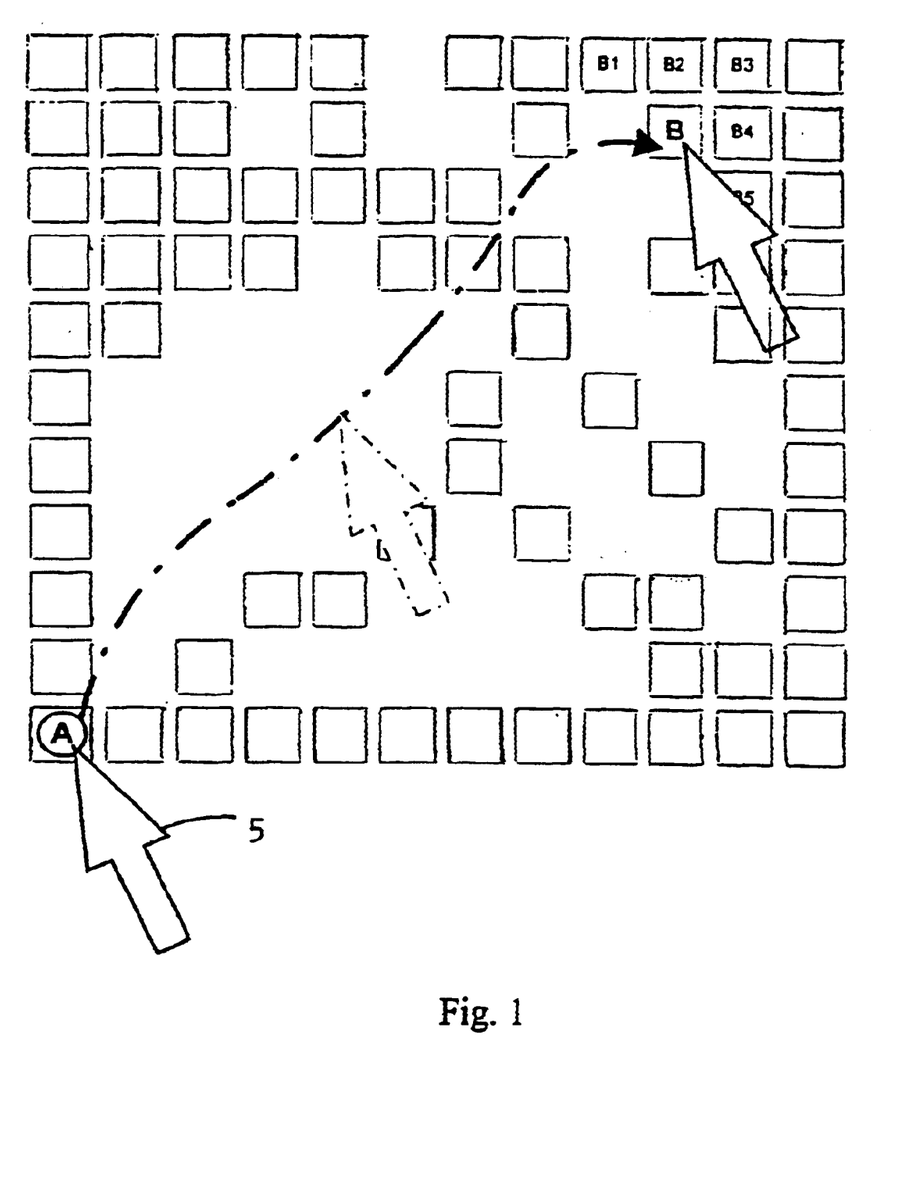
FIG. 1 illustrates the movement of a marker over a computer screen with a number of defined areas.

FIG. 1 shows a segment of an imagined image on a computer screen in which a number of squares indicate "points" which may be marked by the marker 5. The marker 5, which is shown as an arrow head, starts in the shown example with its tip in point A and is moved, lead or steered to point or target object B–a move that e.g. may follow the dotted line between these points. The object of this movement may differ, depending on what level of communication one is in with the computer.

When the marker, however, has been moved to a chosen point a signal is sent to the computer stating that a receipt button (switch) on the pointer tool has been pushed.

As is evident from FIG. 1 it may easily happen, with unprecise control of the marker, that the marker ends up on one of the neighbouring points B1 . . . B5, which may completely different meanings than when it is in point B, when the receipt signal is sent. The operator, who knows this, therefore concentrates when moving the marker so as to avoid mistakes—thus tensioning the muscles in his hand to increase the control. When a pointer device, e.g., a mouse is moved over the supporting surface, control signals are sent from the mouse to a so-called mouse driver providing sequential images of the marker as if it moves following the same pattern over the data screen. The operator may thus control whether what he has done corresponds to the intensions—or if corrections are needed; see the description of FIG. 2 below.

In FIG. 1 a number of squares are shown. As mentioned above these are defined as points, which in practice means that it is not important where the tip of the marker is positioned within the square. The only thing of importance is whether the tip of the marker is inside or outside one of the squares.

Each of the points has a certain meaning depending on the level of communication the operator is in with the computer:

In the opening menu of the operating system each of the points may represent an addressable icon. By moving the marker to one of the icons and signing, one may, e.g., start a text editor, a spread sheet or any other program in the computer.

In, e.g., a text editor each of the points may symbolize letters in a word, as well as numbers or other symbols.

In FIG. 1a "screen image" is shown in which a number of points (squares), each containing a command, possibly some form of information or opening a channel with information (from the keyboard or to the printer, to or from a mass storage such as CD, diskettes, etc); or where the points in another way has a meaning in the communication between the operator and the computer. FIG. 1 also shows that areas without information may exist between the points.

Use of the communication button will not have any reasonable form for meaning for the computer without the marker's point being within one of the points (one of the squares).

One the other hand use of the communication button while the marker's point is positioned within one of the squares mean that the meaning being contained in this point is communicated to the computer for use in the program currently being used.

In the following the mouse provided according to the invention with tactile feedback will be called an "active mouse". The traditional type of mouse will hereafter be called a "passive mouse".

In the same way as a passive mouse, which needs a so-called mouse driver or a computer program translating (one way) information from the mouse to the computer, the active mouse also needs such a program.

The drive program for the active mouse has to be two way, as information is being transmitted both from the operator through the mouse and to the computer, as well as back from the computer to the operator.

Figure 2:
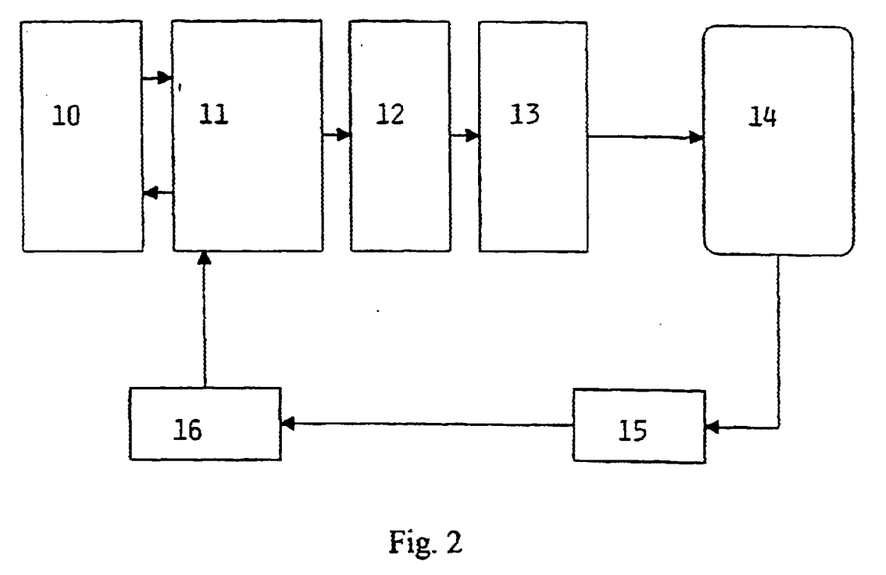
FIG. 2 shows a flow chart illustrating the use of a mouse according to the known art.
Figure 3:
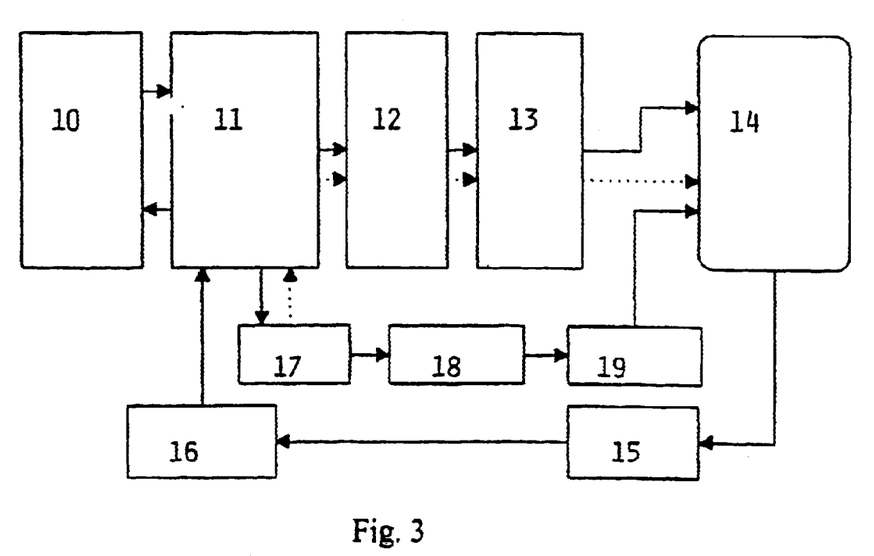
FIG. 3 shows a flow chart of the system according to the invention.

As is shown in both FIGS. 2 and 3 the operator 14 gives information through the mouse driver 16 to the computers operating system 11 by moving the mouse 15 with the hand. The mouse driver 16 generates, using a part of the screen driver 12, an image of an arrow or a marker which moves across the computer screen 13. If the mouse 15 is moved forward the marker moves upward on the screen; if the mouse is moved e.g. to the left or the right, the marker moves to the left or the right, respectively. Using the controls on the mouse 15, and its position on the screen 13, the software 10 installed in the system is controlled. This is similar to both a "passive" and an "active" mouse.

An important part of the active mouse according to the invention is a corresponding computer program 17 (see FIG. 3). This computer program 17 has in this embodiment of the invention three tasks:

The program calculates the most likely chosen movement of the marker 5, based on the first part of the trace of the movement of the marker.

The program replaces then the marker 5, practically immediately, with a vector 6 which is shown from the starting point, which in this case was the point A in both FIGS. 1 and and which ends in the point closest to the most likely direction. The vector 6 has preferably a clearly visible contrast color. The signal path being shown as a dotted line in FIG. 3.

at the same time as the visual vector 6 is shown on the computer screen signals are also sent to a motor drive 18 for a specialized, motor (see FIGS. 6–9) for controlling a special, tactile part 19 of the mouse 15.

Figure 4:
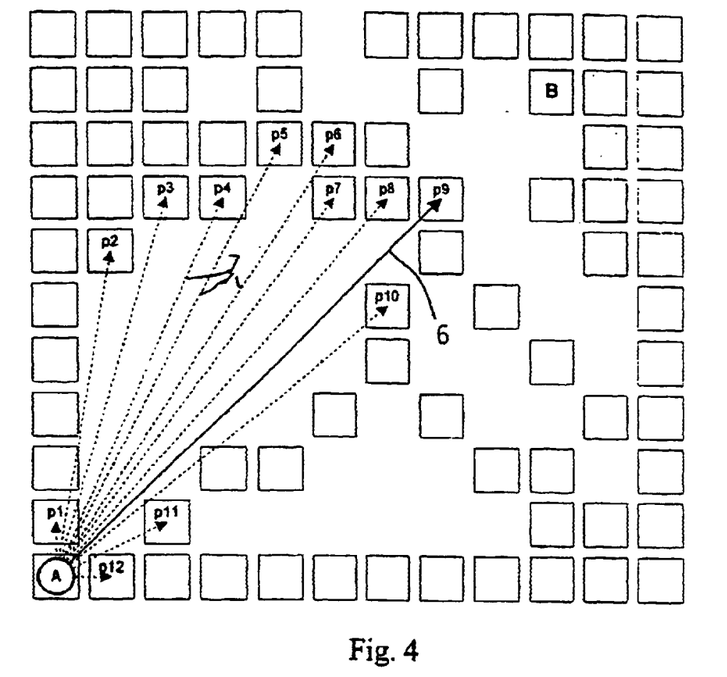
FIG. 4 illustrates the direction calculations for the marker over the screen.
Figure 5:
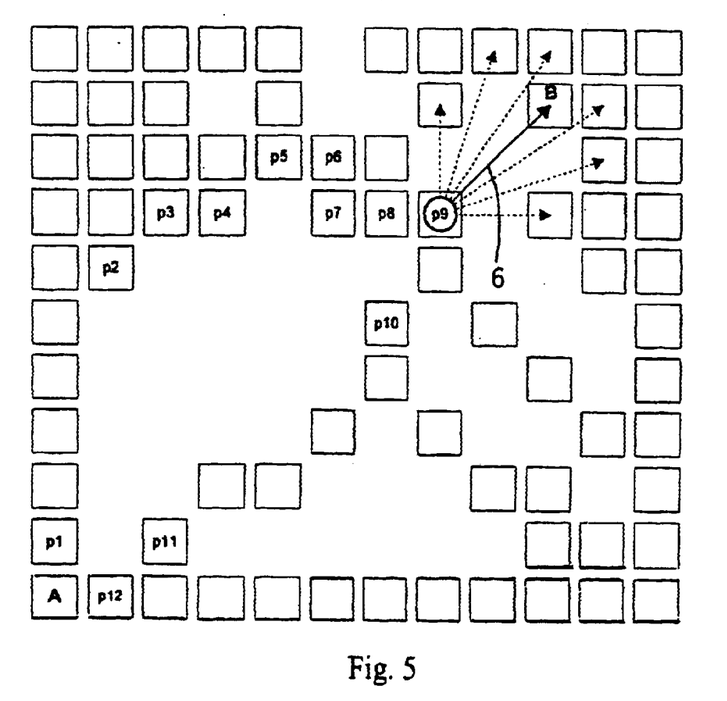
FIG. 5 illustrates a situation similar to FIG. 4, for a chosen zone.

In FIG. 4 the marker's movement started from point A, as in FIG. 1, and the chosen target is B. Depending on how precisely the pointer tool was controlled from the beginning the situation may be contemplated in which vector 6 may initially have a direction towards any of the points p1 ... p12, while the shortest way to the target would have been in two steps from A to p9 and then from p9 to B, as shown in FIG. 5. Let us in this example presume that the first vector that was shown was from A to p4, which essentially corresponds to the direction toward p9. The operator is not happy with the direction and corrects it by shifting the pointer tool to the right. The correction is shown as the direction 7 of the vector sequentially shifts in the direction of p5; p6; p7; p8 and at last p9, which is the preferred direction. Here he is pleased and may signal this by pushing the communication button on the pointer tool. The vector now changes into a marker towards a new movement is started. Possibly a chosen, unique movement of the motor may indicate that the target is reached.

On the way to the partial target: p9, the specialized motor progressively changed its shape under the finger of the operator so that the direction and length of the vector at any time may be felt.

In some cases it will be preferable to let the vector on the screen be hidden, and for example maintain the usual marker, while the active mouse provides the direction and size of the vector. This is especially preferable if the image on the screen is well arranged, so that it is unambiguous from the mouse indications toward which point on the screen the marker is moving.

The abovementioned example is chosen to show how the movement of the vector may be steered toward the target, even if there are many active points on the computer screen.

If there is no "free line of sight" all the way from the starting point A to the target B the path must be divided as shown in FIGS. 4 and 5 in a generalized case. If, however, information is available or experience shows that makes B in the example the most probable target, the program may learn this and automatically start with the vector A–B as the first alternative. Thus time may be saved.

Figure 6A:
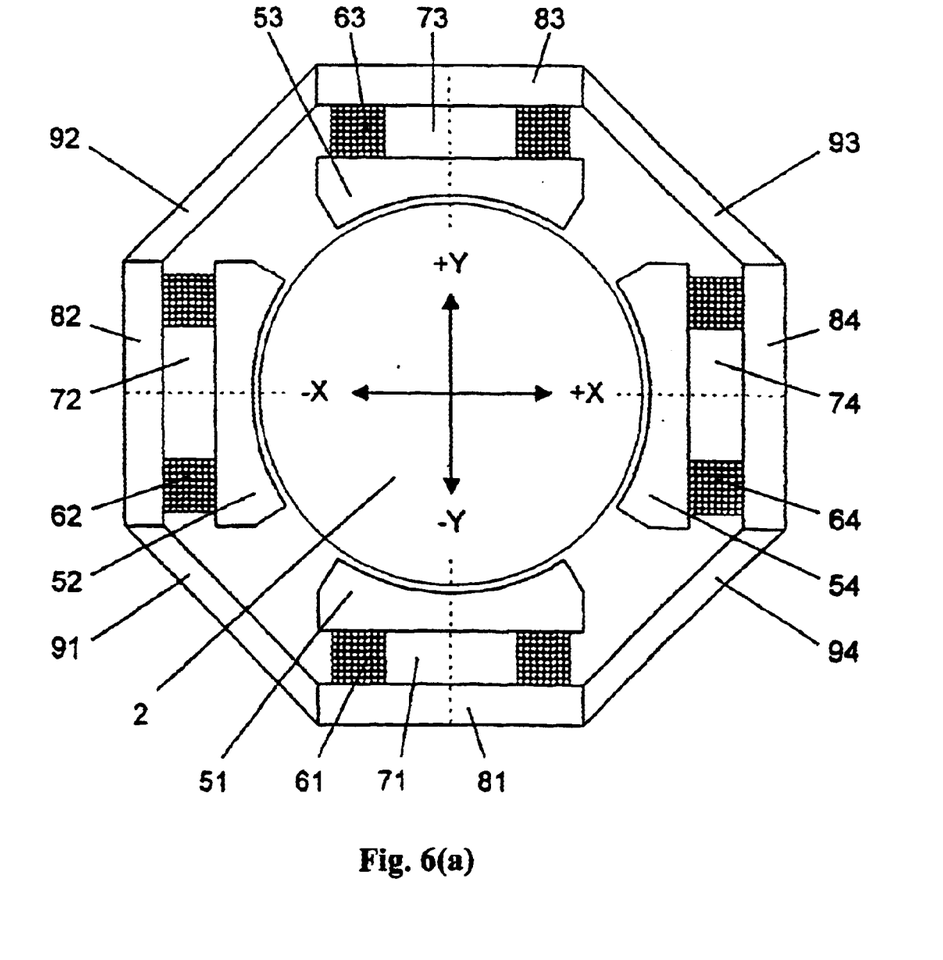
FIGS. 6(a), (b) show an example of a drive unit for the tactile feedback connection on the mouse in horizontal and vertical sections.
Figure 6B:
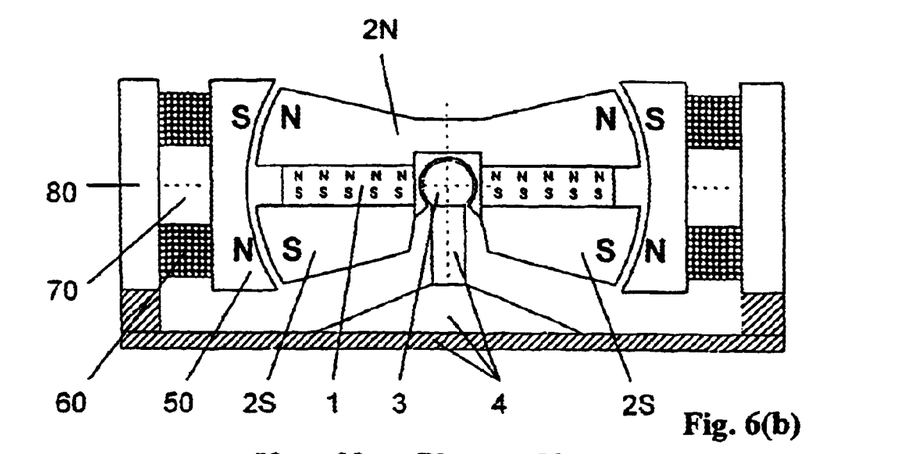

The motor, as is shown in FIG. 6, may be built around a disc-shaped, permanent magnet 1. In FIG. 6 the magnet is shown in a horizontal position with (e.g.) the north pole directed upward and the south pole pointing downward. The magnetic fields are collected and lead toward the sides of ferromagnetic pole shoe (2N) on the upper end and (2S) on the lower end.

From the two projections on FIG. 6 it is clear that the pole shoes (2) are made in a way that gives them a spherical shape on the part of the surface directed toward the sides. The magnet and the pole shoes being assembled in a unit using e.g. a suitable adhesive, is pivotally supported by a sphere 3 which in turn is fastened to a foundation 4. The permanent magnet unit consisting of 1, 2N and 2S is below called an anchor. This may swing freely relative to the pivot bearing within the limits defined by the geometry of the foundation. At the sides of the movable anchor, fastened pole shoes 50 are positioned. Shoes 50 usually close the magnetic field between the anchor pole shoes 2N,2S, see the side projection on top of FIG. 6. The pole shoes 50 are coupled to the field collector through a coil core 70, which all are made from ferromagnetic materials. Around the coil core 70 a coil 60 of insulated copper wire 600 is wound; see FIG. 7. If an electrical current is passed through the coil an electromagnetic field is generated around it.

At the bottom of FIG. 6 a horizontal section of the motor is shown. It is evident from this that it contains a total of four coils 61; 62; 63; 64, which the coils 61 and 63 are coupled in a series—and likewise the coils 62 and 64; see also FIG. 7. The four coils are coupled to the pole shoes 51; 52; 53; 54 and field collectors 81; 82; 83; 84 through the respective coil cores 71; 72; 73; 74. The field collectors are ultimately coupled to each other through the magnet conductors 91; , 92; 93; 94 so that the fields being generated by transmitting electrical current through the copper coils, also are closed.

As current is passed through the coil pair 62; 64 the anchor will try to move in (+/−) X direction in FIG. 6. As the current is passed through the coils 61; 63 the anchor will seek to move in the (+/−) Y direction in FIG. 6.

Figures 7A, 7B:
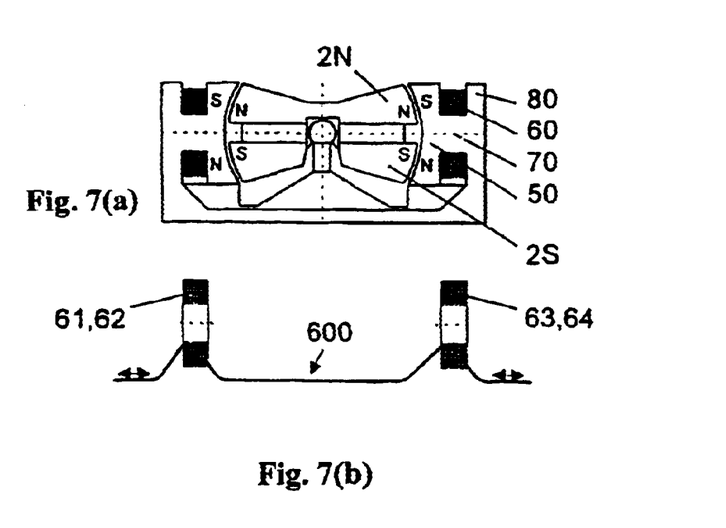

In FIG. 7 the anchor with the permanent magnet as well as the fastened pole shoe with copper coils are shown in the upper part of the figure while the serial coupling of the 2+2 coils are shown at the bottom. No electrical current is passed through the coils in the shown position in FIG. 7.

Figures 8A, 8B:
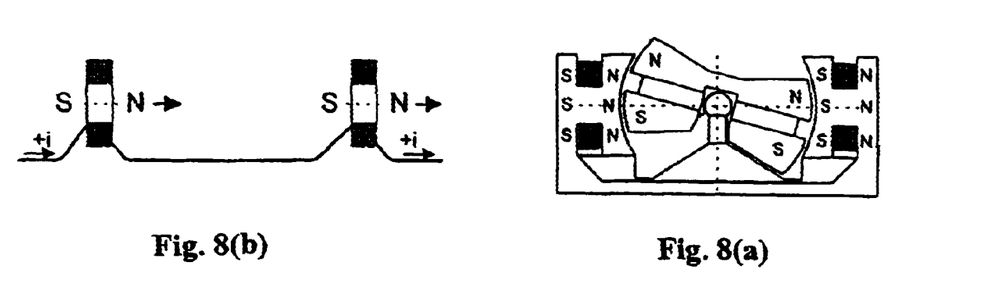
Figures 9A, 9B:
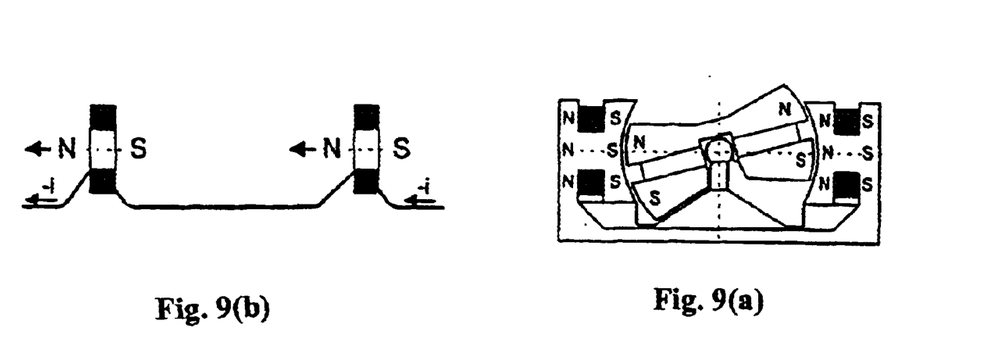

In FIGS. 8 and 9 it is the principle how the magnetic fields generated by transmitting an electrical current will affect the position the anchor. The anchor may thus be rotated in the two independent orthogonal directions X and Y of the two coil pairs. The extent of the rotation in each of the direction will by suitable design of the anchor and pole shoe, be proportionally increasing with increasing current through the coils. If an electrical current is lead through the coils a magnetic field will be generated around each of the coils with north-south directions as shown at the left of FIG. 8 below. The magnetic fields will be collected by the fastened ferromagnetic coil cores and pole shoes so that the equalization of the magnetic field through the pole shoes on the rotatable anchor is disturbed. The anchor will immediately rotate towards a new equilibrium position as shown at the right in FIG. 8. The angular deflection of the new equilibrium relative to the equilibrium without current through the coils, will be essentially proportionally increasing with increasing current. If the anchor is hindered from moving freely the anchor will react with a reaction force being proportionally increasing with the current strength. If the current direction is reversed, as illustrated in FIG. 9, the field direction will be reversed, and the anchor will try to move in the opposite direction.

The anchor will thus rotate relative to the centre of the spherical bearing 3, both in the (+/−) X and Y direction, i.e. in principle in all directions in the XY plane, and with indications being proportional to the current in the respective coil pairs. The magnitude of the indication may be chosen to indicate the distance from the marker to the target object or, in some cases, the velocity across the screen.

The object of the anchor in the motor unit is to translate the signals from the motor drive to a tactile indication to be interpreted by the finger tip resting on the motor unit so as to sense a representation of the vector in FIGS. 4 and 5, both in size and direction, so that both speed and direction may be felt.

The anchor is, however, not necessarily ideal for filling this task alone, and the split opening between the pole shoes 2 of the anchor and the fastened pole shoes 51 ... 54 must be protected against particles and dirt in order to secure an undisturbed operation.

Figure 10:
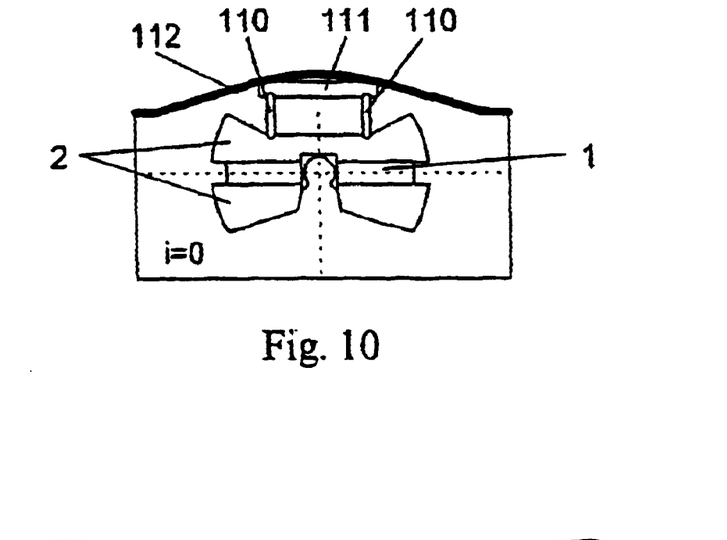
FIG. 10 illustrates the tactile surface of the mouse with the drive.

Depending on which type of pointer tool is used the connection between the anchor and the contact surface, with corresponding dirt protection, may have require slightly different embodiments. Below, on FIG. 10, an embodiment is shown being suitable for use together with a mouse being used as pointer tool. In order to avoid a collision between the protruding edge of the upper pole shoe of the anchor and the finger, a moveable part is provided between as a "contact surface" 111 in a suitable vertical distance from the anchor. The contact surface 111 may be shaped more ergometrically advantageous than what is possible with the anchor. The movements of the anchor is transmitted to the contact surface 111 through three transmission pins 110 of which two are shown in FIG. 10. Through the transmission pins it is made sure that the movement of the surface 111 follows the movements of the pole shoe 2 on the anchor. In FIG. 10 the geometry for the contact points between the surfaces 2 and 111 and the pins 110 shown as a rectangle (parallelogram), which provides a representation of the pattern of movements, essentially 1:1 between the two surfaces. If the geometry is changed so that the contact points make out a trapezoid, the movements of the contact surface is increased or decreased relative to the anchor movements, depending on the bearing distance being largest on the anchor or on the contact surface.

Figure 11A:
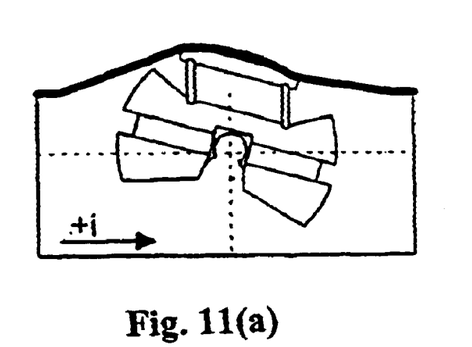
FIGS. 11(a), (b) illustrate changes in the surface when voltages are applied.
Figure 11B:
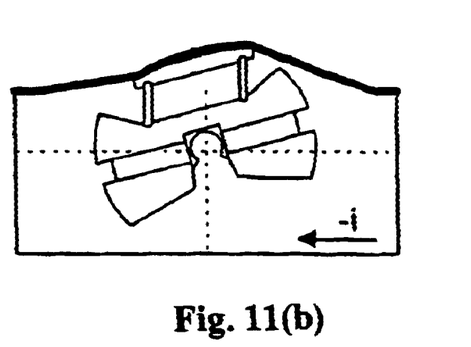

To the circumference of the two-axis motor a double curved plate or membrane of an elastic material 112, e.g. of silicone rubber or similar, is fastened. The contact surface 111 is also fastened to this elastic membrane so as not to be shifted relative to the membrane. Thus the contact surface 111 is kept essentially in place right above the anchor, even if it moves as a result of a current being sent through the coils, see FIG. 11, in which the effect of a current direction (+) is shown on the right figure while a corresponding effect of the opposite current direction (−) is shown on the left.

Figure 12A:
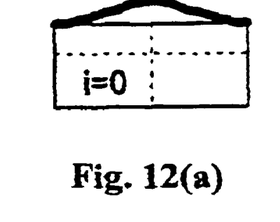
FIGS. 12(a), (b), (c) show a simplified sketch of changes in the surface.
Figure 12B:
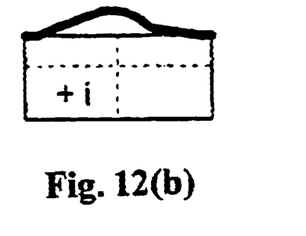
Figure 12C:
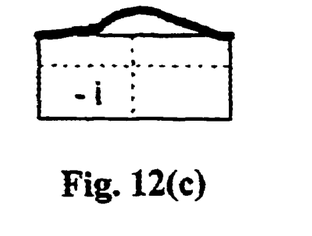

In FIG. 12 the contours of the bi-axial motor is shown from one side. To the left in the figure the motor is shown with a neutral position. In the drawing in the middle the motor is shown with an indication generated by a current in one direction, and t to the right with an indication in the opposite direction.

The motor may give indications both in the X and the Y directions. In FIG. 12 it is by purpose not shown if it is X or Y indications that are shown in the drawings as they would be identical in both cases.

The motor is positioned on the pointer tool under the most natural contact point for the operator's fingers, and is constructed so as to shape the support in a way which in principle gives the operator the same information about the direction of the vector's direction and length as he simultaneously may see on the screen.

Figure 13:
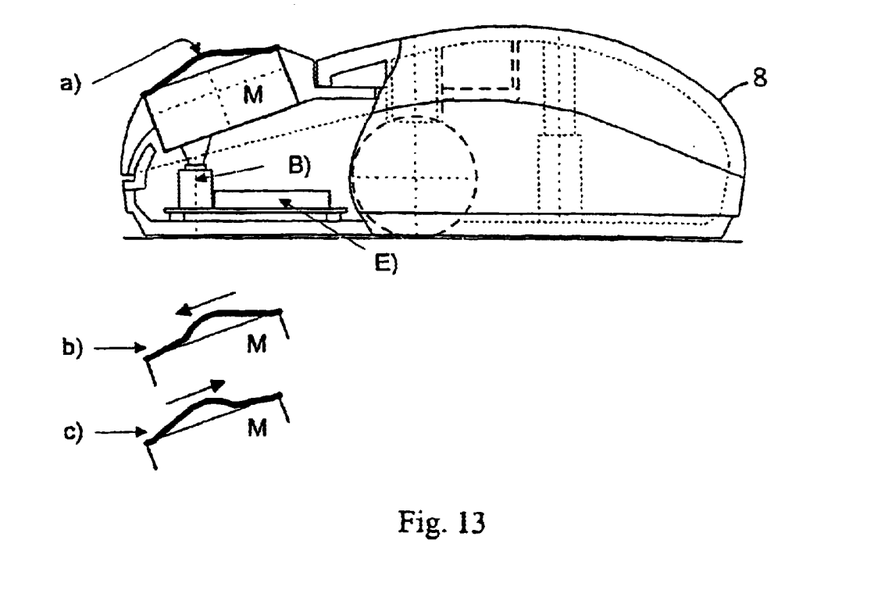
FIG. 13 shows a vertical section of an active mouse.

In FIG. 13 it is shown how the self developed "motor" M may be integrated into one of the buttons on a "standard" mouse. The mouse is thus in a simple way changed from being "passive" to "active". The motor follows the movements of the communication button, and the communication button B and the electronic card E is activated by pushing the motor down. The card E may simply be extended to comprise the necessary drive electronics for the motor M.

When an active mouse is produced one may therefore use existing components from the passive mouse with the exceptions of the electronic part E and the button, which must be rebuilt so that it contains the biaxial motor M.

The "active mouse" may be used exactly as a "passive mouse". The operator's finger rests, as before, on the left communication button. If he wants to send a signal it is pushed the same way he is used to. The signal is transmitted through the motor. The contact point for the finger tip is, however, on the button in the same position as the contact surface 111. The operator will therefore already without training be able to feel a movement in the motor M corresponding to the extra image the system generates on the screen.

In FIG. 13 a normal resting position is drawn as contour a). If the image showing the marker's most likely new position implies that it moves "upward" on the screen, the motor moves corresponding to contour b). Correspondingly the movement "downward" is shown with the motor's movement corresponding to contour c).

Figure 14:
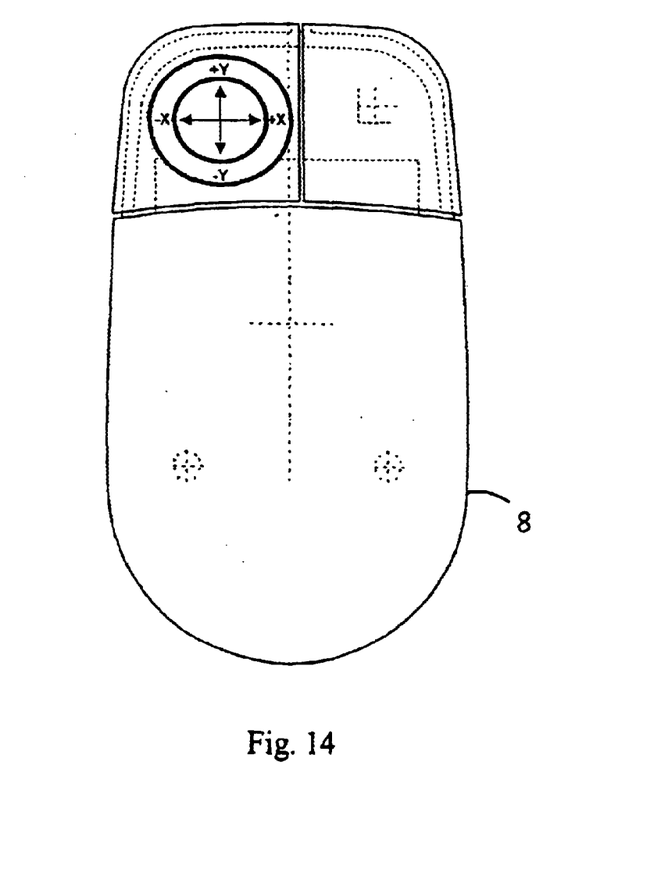
FIG. 14 shows a horizontal projection of the mouse in FIG. 13.

In FIG. 14 the "active mouse" is shown from above. On the bi-axial motor on the figure integrated in the left mouse button the axial directions X and Y are indicated.

Even if the description above refers to an active mouse with a possibility for indicating movements in two dimensions it is also possible to extend this to a third dimension, by providing the tactile part with an ability to move vertically. This may be used to indicate surface structures on the screen, as well as indicate the borders of the different areas on the screen, so that the user may feel when he for example enters a new window. This will technically be achieved when all the coils 61; 62; 63; 64 in FIG. 6 are adapted to provide the same polarity relative to the permanent magnet 1, so that it is lifted or lowered. The embodiment of the bearing 3,4 and the pole shoes 51; 52; 53; 54 must be altered in a way obvious in the art.

What is claimed is:

1. Apparatus for man-machine interaction using a pointer tool comprising an indication device for tactile feedback information to the user, wherein the indication device for tactile feedback is adapted to transmit tactile information in at least two dimensions and comprises a movable part, said indication device comprising a rotatably supported permanent magnet adapted to partially rotate relative to a support point and being connected to said movable part, and two or more electromagnetic devices for applying a magnetic field to the permanent magnet in at least two directions, thus to generate a partial rotation of the permanent magnet to move said movable part in said at least two dimensions.

2. Apparatus according to claim 1, wherein the indication device comprises a flexible membrane connected to the moveable part.

3. System incorporating an apparatus according to claim 1 for man-machine interaction in relation to a visual presentation device, comprising calculation means for:

1) calculating the direction of movement of a marker on said visual presentation device, and 2) recognition of a presumed target in the calculated direction, wherein the indication device for tactile feedback is adapted to indicate, by moving said movable part, the direction to the target on said visual presentation device.

4. System according to claim 3, wherein said electromagnetic devices are coupled to said calculation means, and said calculation means controls the applied magnetic fields as a function of the direction to the target.

5. System according to claim 3, wherein a vector for the calculated direction and the presumed target is indicated on said visual presentation device.

6. System according to claim 3, comprising estimating means for estimating the target for the marker's movements, wherein the magnitude of the movement of said movable part is graded in relation to the distance from the marker to the target.

7. System according to claim 4, wherein the strength of the applied magnetic fields is adapted to be proportional to the distance between the marker and the target of the movement.

* * * * *